United States Patent [19]
Warrior et al.

[11] Patent Number: 5,333,114
[45] Date of Patent: Jul. 26, 1994

[54] FIELD MOUNTED CONTROL UNIT

[75] Inventors: Jogesh Warrior, Chanhassen; Vincent C. Jacobson, Minnetonka; Kelly M. Orth, Apple Valley; Craig R. Tielens; Jane B. Lanctot, both of Minneapolis, all of Minn.

[73] Assignee: Rosemount Inc., Eden Prairie, Minn.

[21] Appl. No.: 86,167

[22] Filed: Jul. 1, 1993

Related U.S. Application Data

[63] Continuation of Ser. No. 2,257, Jan. 8, 1993, abandoned, which is a continuation of Ser. No. 785,168, Nov. 13, 1991, abandoned, which is a continuation of Ser. No. 416,180, Oct. 2, 1989, abandoned.

[51] Int. Cl.$^5$ ............................................. G05B 19/00
[52] U.S. Cl. ................................ 364/550; 340/310 A; 364/138
[58] Field of Search ................... 340/310 A; 364/138, 364/139, 550

[56] References Cited

U.S. PATENT DOCUMENTS

| | | | |
|---|---|---|---|
| Re. 33,267 | 7/1990 | Kraus | 364/158 |
| 3,582,621 | 6/1971 | Lawler | 364/138 |
| 4,074,354 | 2/1978 | Nakagawa et al. | 364/139 X |
| 4,302,750 | 11/1981 | Wadhwani et al. | 340/310 A X |
| 4,325,399 | 4/1982 | Frick | 137/85 |
| 4,347,564 | 8/1982 | Sugano et al. | 364/132 |
| 4,517,637 | 5/1985 | Cassell | 364/138 |
| 4,598,381 | 7/1986 | Cucci | 364/558 |
| 4,639,852 | 1/1987 | Motomiya | 364/138 |
| 4,760,859 | 8/1988 | Brown | 137/84 |
| 4,818,994 | 4/1989 | Orth et al. | 340/870.21 |
| 4,833,922 | 5/1989 | Frick et al. | 73/756 |
| 4,866,435 | 9/1989 | Frick | 340/870.16 |
| 5,089,974 | 2/1992 | Demeyer et al. | 364/550 X |
| 5,146,401 | 9/1992 | Bansal et al. | 364/138 |
| 5,150,288 | 9/1992 | Imai et al. | 364/138 X |
| 5,185,708 | 2/1993 | Hall et al. | 364/550 |

FOREIGN PATENT DOCUMENTS 8114128 1/1983 France.

OTHER PUBLICATIONS

Brochure by Fairchild, "Field Mountable Pid Controllers." Mar. 1992, pp. 2-6 & 13-16.

(List continued on next page.)

Primary Examiner—Edward R. Cosimano
Attorney, Agent, or Firm—Westman, Champlin & Kelly

[57] ABSTRACT

A smart field-mounted control unit, for controlling a process, receives signals and sends a command output over a two-wire circuit which powers the control unit. An input section receives the signal, which can be instructions representative of commands or instructions sets, process variables sensed by external control units or setpoints representative of a desired process state. The instructions are representative of a control requirement of the process and adjust a controlling section in the control unit to generate the command output in conformance with the control requirement. The command output can be a function of the difference between the process setpoint and a process variable, or a function of a linear combination of a process variable and its calculated time integral and time derivative functions. A sensing section in the control unit can sense and scale a process variable for generating the command output as well, The control unit can include a regulator section, controlled by the command output, which regulates application of a mechanical, hydraulic, pneumatic or electromagnetic force applied to the process.

37 Claims, 5 Drawing Sheets

OTHER PUBLICATIONS

*Brochure by Valtek Incorporated,* "Starpac Intelligent System", Dec. 1990, pp. 2–8.

*Control Engineering,* "I/P and P/I Converters Keep Their Analog Role", by S. J. Bailey, Mar. 1988, pp. 42–45.

*Doric,* "Features Summary and Ordering Guide and Operators Manual" for the Control: 80 Digital Multi Loop Controllers. (No Date).

*Instrument Engineers' Handbook,* "Volume 1, Process Measurement", Edited by Bela G. Liptak, 1969, pp. 6–17.

*Instrument Society of America,* "Compatibility of Analog Signals for Electronic Industrial Process Instruments", 1975, pp. 5–11.

Fisher & Porter *Product Bulletin,* 1982, pp. 1–9, A30 & A31.

Journal A, "The Use of Local Area Networks in Distributed Process Control Systems", vol. 25, No. 4, Oct. 1984.

*Machine Design,* "Digital Signal Processors Simplifying High-Performance Control", No. 20, Sep. 10, 1987.

R. J. Lasher memo Re. SP-50 Application Subcommittee Plans dated, Aug. 25, 1988.

ISA-SP50-1986-17-C. "Instrument Society of America, Standards & Practices 50", dated Jan. 15, 1987.

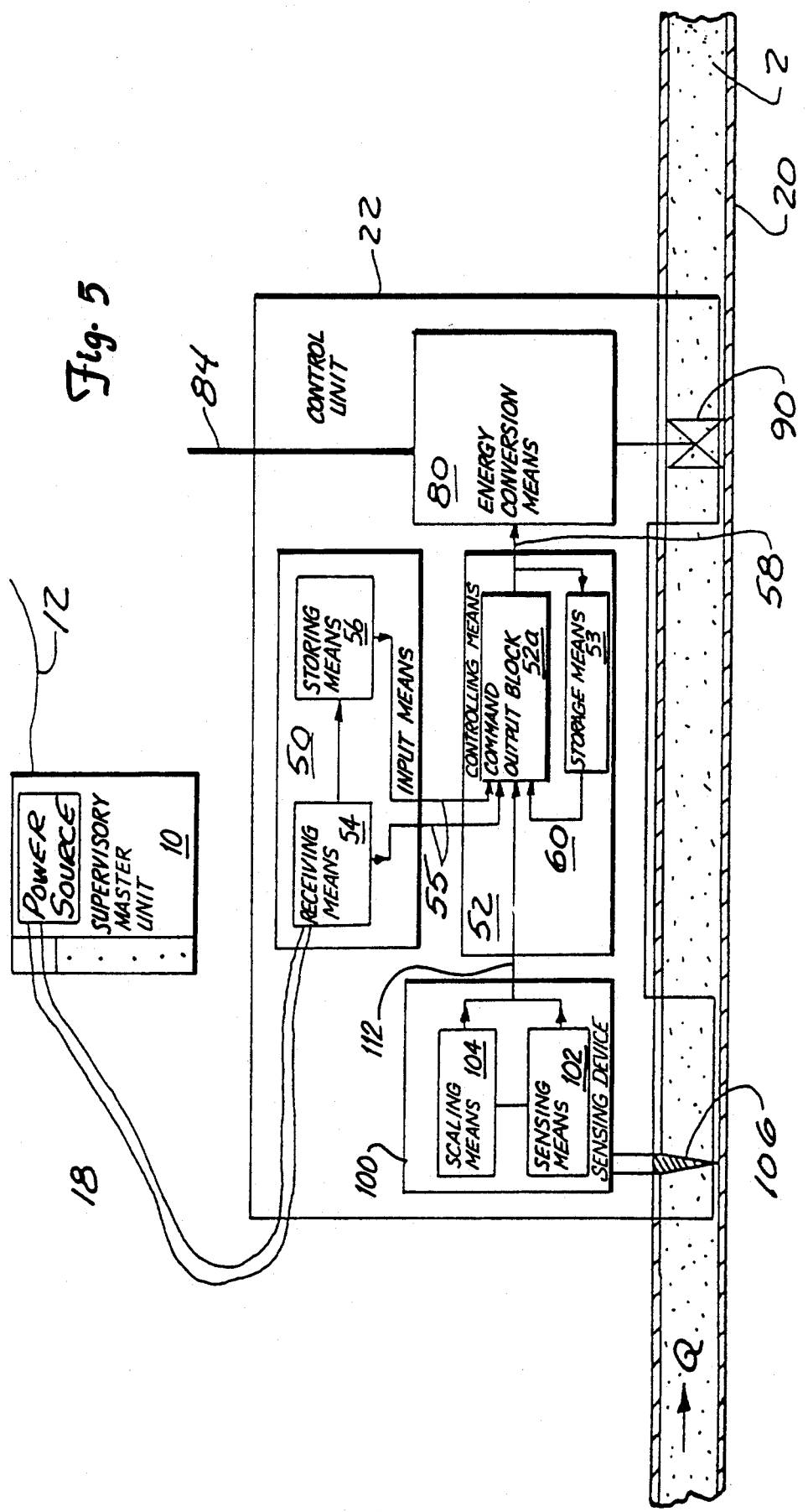

FIELD MOUNTED CONTROL UNIT

This is a continuation of application Ser. No. 08/002,257 filed on Jan. 8, 1993, abandoned as of the date of this application which is a continuation of application Ser. No. 07/785,168 filed Nov. 13, 1991, abandoned Jan. 8, 1993, which is a continuation of application Ser. No. 07/416,180 filed Oct. 2, 1989, abandoned Nov. 13, 1991.

FIELD OF THE INVENTION

The present invention relates to a transmitter communicating over a two-wire circuit and providing an output representative of a process variable produced by a process.

BACKGROUND OF THE INVENTION

Transmitters measure process variables representative of a process controlled by remote devices and communicate transmitter outputs representing the process variables to controllers over two wire circuits. The transmitters are typically mounted in a field area where current and voltage levels are limited to provide intrinsic safety. The transmitter output is scaled by user definable parameters such as span, zero and damping. Span and zero adjustments allow the user to reference the measurement range extremes of the transmitter to specific transmitter output levels, thereby setting the range of desired outputs. Damping affects the response time of the transmitter to changes in the process variable. The scaled transmitter output wire is sent over the two wire circuit to the controller.

Controllers, typically located in a control room, combine the transmitter output with signals representing other process variables to generate command output signals. Command output signals are typically sent over a separate pair of wires to remote devices, such as a valve, which control the process according to the command output. In certain applications, controllers select the most appropriate set of instructions for process control from multiple sets of instructions, depending on the process to be controlled and the accuracy required.

In other applications, controllers sense several transmitter outputs representing process variables to determine the command output for the remote device. Typically, a separate transmitter senses each process variable. The transmitters send a signal representative of the sensed process variable to the controller over a two wire circuit, the controller determines the command output and controls the remote device, such as a valve position, pump speed, thermostat setting, etc.

One limitation of the prior art arrangement is that the transmitter, remote device and controller, components in the feedback loop, must all operate continuously for control of the process. Another limitation is the amount of interconnecting cabling connecting the feedback loop components. The controller is typically far from the process in a control room, while the remote device and the transmitter are usually in the field and physically proximate to each other and the process. Installation and maintenance complexity is another limitation, since each cable may require installation of an intrinsic safety barrier device at the interface between the control room and the field devices. In cases where multiple process variables are used by the controller, cabling is required between each transmitter and the controller. Feedback loop reliability is a fourth limitation, since failure of one of several interconnections adversely affects process control.

To reduce these limitations, a process variable transmitter provides a control output directly, thereby by-passing the controller itself. Outputs representative of other process variables are communicated to the transmitter rather than the controller. The transmitter can still communicate with the controller over a common two-wire link, but the link can be broken without interrupting control. Process control reliability and response time is enhanced and control is realized with fewer communication exchanges while installation complexity, maintenance complexity and cost decreases.

SUMMARY OF THE INVENTION

The present invention relates to a smart field-mounted control unit providing a command output for controlling a process and communicating over a two-wire circuit which powers the unit. The control unit includes an input section which receives process signals representative of more than one process variable on the two wire circuit, storing values of the process signals as appropriate. The unit also includes a controlling section coupled to the input section for providing the command output and storing its value. The command output is a function of the stored process signals. A stored previous value of the command output may also be used in providing the command output.

One embodiment of the invention includes an energy conversion section coupled to the controlling section for receiving pneumatic, hydraulic or electromagnetic energy and for regulating such energy applied to the process as a function of the command output.

Another embodiment has a sensing device, coupled to the controlling section, which senses and scales a first process variable. In such case, the process signals for determining the command output include the scaled first process variable.

In these embodiments, the process signals received from the two wire circuit can determine operation of the controlling means in producing a command output. Alternatively, the process signals comprise a process variable reported to the control unit over the two wire circuit or a set of instructions sent over the two wire circuit for determining the command output. When the process signals comprise a setpoint representative of a desired state of the process, the controlling section can generate the command output as a function of the difference between the setpoint and the process variable. As appropriate for the process to be controlled, the controlling section uses an equation including a linear combination of the process variable and the time integral of the process variable to determine the command output. As the application requires, the equation for determining the command output includes the time-rate-of-change of the process variable.

BRIEF DESCRIPTION OF THE DRAWINGS

FIG. 5 shows a block diagram of a fourth preferred embodiment of a control unit.

DETAILED DESCRIPTION OF THE PREFERRED EMBODIMENTS

Figure 1:
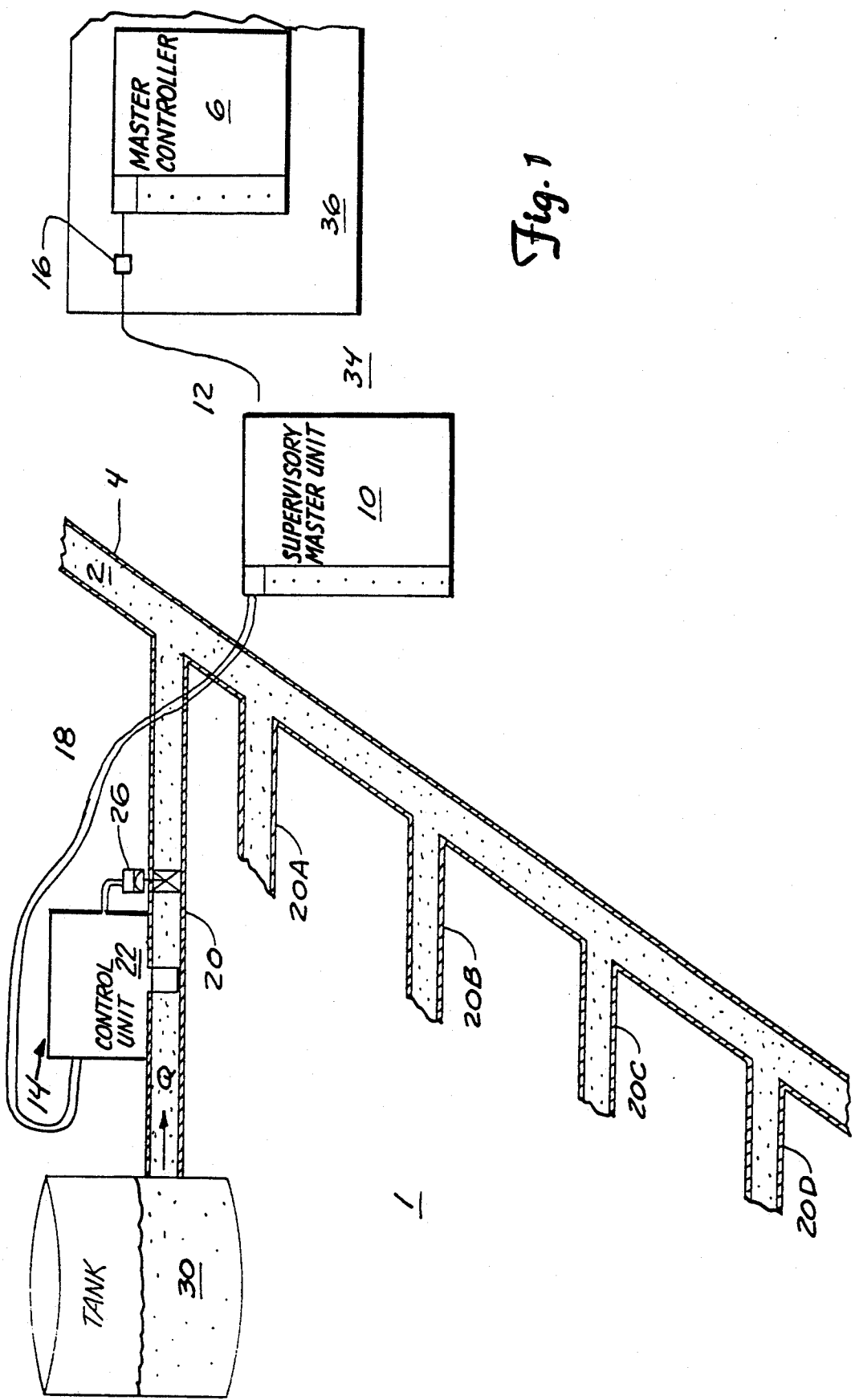
FIG. 1 shows a diagram of a part of a process control system having a control unit according to the present invention, a supervisory master unit and a master controller.

FIG. 1 shows an industrial process control application as in a petrochemical tank farm 1, where a fluid 2 flows in a pipe network 4. A master controller 6 commands a supervisory master unit 10 via a cabling 12. Supervisory master unit 10 communicates over a two wire circuit 18 with a feedback loop 14, which controls flow in pipe segment 20. Feedback loop 14 comprises a control unit 22 and a two terminal remote device 26, which controls fluid flow, Q, from a tank 30 into pipe network 4. The capacity of tank farm 1 can be expanded by additional feedback loops, located at pipe segments 20A, 20B, 20C and 20D and controlled by master supervisor 10. An even larger expansion requires even more additional feedback loops and additional supervisory master units. Regardless of capacity, tank farm 1 is divided into a field area 34 requiring intrinsically safe equipment and a control room area, indicated by block 36. An intrinsically safe barrier device 16, which limits voltage and current to specified levels, is mounted on cable 12 at the interface between control room 36 and field 34. Each additional cable between control room 36 and field 34 requires installation of such a barrier device.

The flow, Q, in pipe segment 20 is given as:

$$Q = k\{\rho \cdot DP\}^{0.5} \quad (1)$$

where Q is the mass flow rate, $\rho$ is the density of fluid 2, DP is the differential pressure across an orifice in pipe segment 20 and k is a constant of proportionality. This calculation of flow requires one process variable representative of differential pressure.

However, when $\rho$ varies as is typical in petrochemicals, a more accurate assessment of the flow, Q, is given as:

$$Q = k'\{AP \cdot DP/AT\}^{0.5} \quad (2)$$

where AP is the absolute pressure in pipe segment 20, k' is another constant of proportionality and AT is the absolute temperature of fluid 2. Two additional process variables, absolute temperature and absolute pressure are required.

Figure 2:
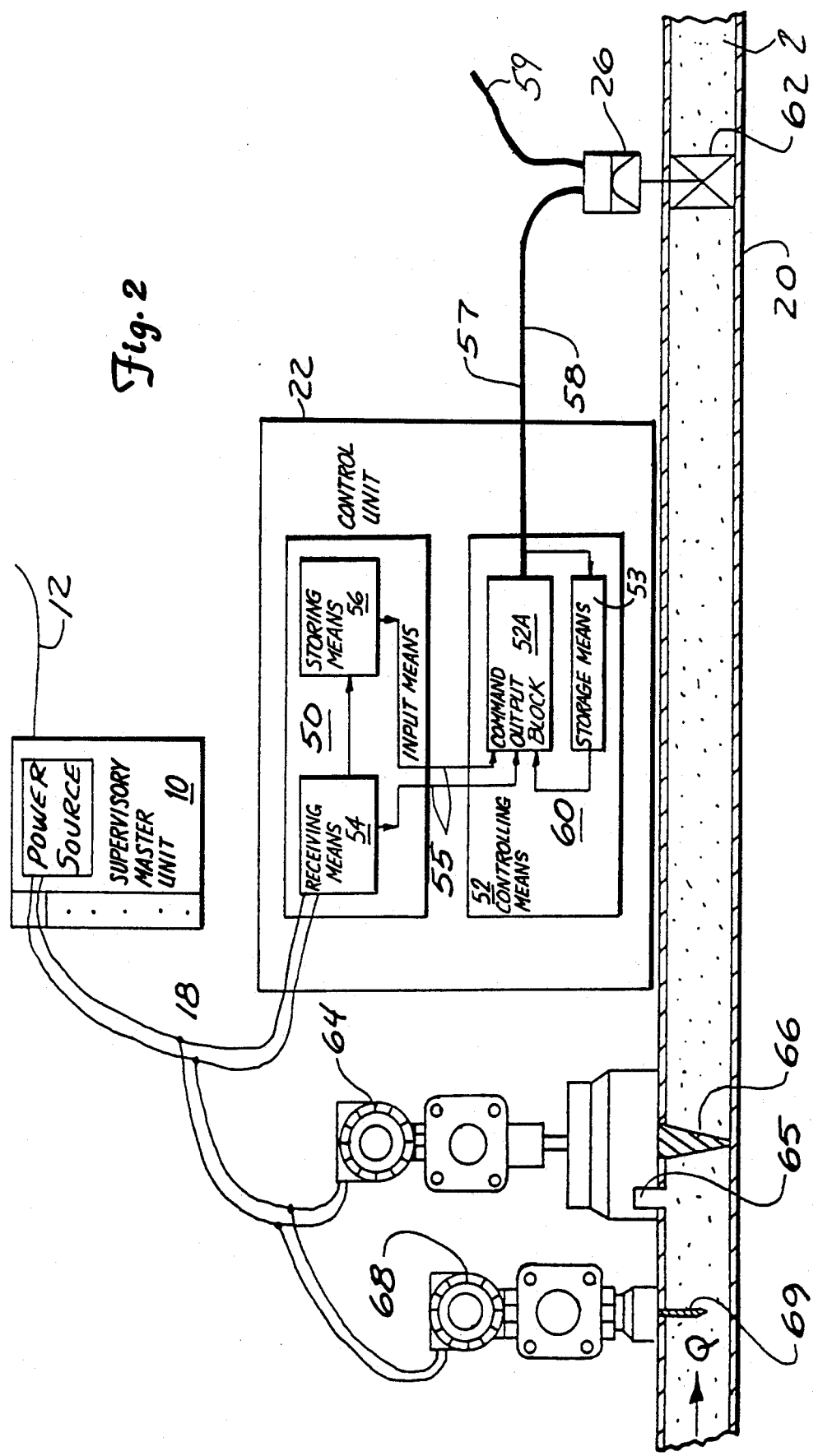
FIG. 2 shows a block diagram of a first preferred embodiment of a control unit and a remote device.

FIG. 2 shows a first preferred embodiment of "smart" control unit 22, communicating with supervisory master unit 10 over two wire circuit 18 and comprising input means 50 and controlling means 52. "Smart" means that a computing capability is in the control unit, such as is performed by a microprocessor. Control units are connected in two wire circuits in a variety of ways. Each two wire circuit is coupled to a power source powering instruments on the circuit. In a first configuration, the supervisory master unit includes the power source which powers a control unit. Additional control units may be powered by the supervisory master unit and are connected in parallel across the power source. In a second configuration, the supervisory master unit includes the power source which powers at least one control unit and at least one remote device, connected in series across the power source. In a third configuration, a control unit used in the first configuration powers one or more remote devices, control units or both. The number of instruments receiving power is typically limited by available current, but alternative power sources are sometimes available for remote devices. The remote device may be connected to the control unit by a pair of wires, or alternatively, by a second two wire circuit.

Control unit 22 is connected in a two wire circuit 18 as in the first configuration described above, but may be connected as described above in other configurations. The input means 50 has receiving means 54 coupled to two wire circuit 18 for receiving process signals and storing means 56 coupled to receiving means 54 for storing process signals 55. Controlling means 52 receives process signals 55 from receiving means 54 and storing means 56 of input means 50, as desired. A storage means 53 receives command output 58 and outputs a previous command output 60. Command output 58 is provided by block 52a as a function of process signals 55 and previous command output 60 and coupled to cable 57, which may be part of a second two wire circuit depending on the configuration. The command output 58 can be provided in some applications as a function of process signals 55 alone. A control unit such as this is used in a feedforward control application, where no feedback is used to generate the command output. In either application, remote device 26 is a transducer such as one which uses a current magnitude to regulate a pressure and is known in the process control industry as a current to pressure (I/P) converter. In a cascaded control application, however, the command output of one control unit is used as a process signal representative of a setpoint for another control unit. Accordingly, in a cascaded control application, remote device 26 is another control unit 22.

Remote device 26 applies an energy source 59 of pneumatic air to the process as a function of the command output 58. Process signals used in generating command output 58 comprise setpoints representative of a desired process state, process variables produced by the process, commands directing the operation of controlling means 52, instruction sets in part or in whole for operation of controlling means 52, coefficients of terms for controlling means 52 and requests for status information about control unit 22 from supervisory master unit 10. Different types of process signals are sent to control unit 22 depending on control unit 22 and the process control application.

A first type of process signal is the process variable. Process variables are categorized as primary process variables when they are directly representative of the variable to be controlled by the feedback loop. The primary process variable for control unit 22 is flow. Secondary process variables affect the primary process variable and are typically used to more accurately assess the primary process variable. Such compensation techniques are disclosed in U.S. Pat. No. 4,598,381 titled *Pressure Compensated Differential Pressure Sensor and Method*, owned by the same assignee as this application and incorporated herein by reference. Alternatively, two process variables representative of the same measurand are sent to control unit 22 from different instruments on the same feedback loop, providing redundancy of a critical measurement. In this embodiment, a transmitter 64 senses differential pressure across an orifice 66 in pipe segment 20 and absolute pressure via a pressure inlet 65. A temperature transmitter 68 senses absolute temperature of fluid 2 via a thermocouple 69. Controlling means 52 use process signals 55 representative of differential pressure, absolute pressure and absolute temperature, sent over two wire circuit 18 from transmitters 64 and 68, to adjust command output 58 according to Eq. 2.

A second type of process signal is the setpoint, indicative of a desired process state. In this application an example of a setpoint is a desired flow of 10 liters$^3$/minute in pipe segment 20. Typically, process signals 55 representative of a setpoint and representative of process variables are sent to control unit 22. The primary process variable is typically compensated by other process variables sent over circuit 18. Controlling means 52 evaluate the difference between the setpoint and the compensated process variable and adjust command output 58.

Another type of process signal 55 is representative of commands which select between instructions sets stored in control unit 22 for providing command output 58. For example, a shut-down command causes command output 58 to be governed by an instruction set for safely shutting down feedback loop 14. Shut-down commands allow manual intervention of feedback loop 14. Another type of command instructs control unit 22 to adaptively set its own instruction set for operation of controlling means 52. In adaptive control, the instruction set may vary as a function of time. In such mode, control unit 22 calculates its own terms and coefficients, as desired, for operation of controlling means 52. Alternatively, another command may cause control unit 22 to operate in an exceptional mode, where it communicates with supervisory master unit 10 only if process variables exceed specified limits. Exceptional mode operation reduces communications between instruments in tank farm 1 and releases supervisory master unit 10 from continually communicating with feedback loop 14. The resulting decrease in communication overhead frees supervisory master unit 10 to monitor larger numbers of feedback loops and to perform more duties than before.

Process signals representative of instructions sets, in part or whole, are sent to control unit 22 to direct operation of controlling means 52. Partial instruction sets are sent to control unit 22 when a subset of an instruction set is needed to adjust command output 58.

A typical instruction set adjusts command output 58. A general equation for control is given:

$$\Delta q_K = \sum_{i=0}^{K} a_i r_i + \sum_{i=0}^{K} b_i y_i \quad \text{Eq. 3}$$

where $q_K$ is the command output at the Kth time, $r_i$ and $y_i$ are the setpoint and process variable values at the ith time respectively, i varies from 0 to K, and $a_i$ and $b_i$ are application specific constants which may be time varying. Many applications require control action in which the output is proportional to a substantially linear combination of the input process variable, the time integral of the process variable and the time-rate-of-change of the process variable, sometimes called proportional-integral-derivative (PID) action. The following equations define constants $a_i$ and $b_i$ from Eq. 3 appropriately for PID control action. The constant $a_i$ for the present time and two previous evaluations are defined in Eq. 3.1a–c:

$$a_K = K_P + K_I \quad (3.1a)$$

where $K_P$ and $K_I$ are defined as proportional or integral gain constants.

$$a_{K-1} = -K_P, \text{ Eq.} \quad (3.1b)$$

$$a_{K-x} = 0, \text{ where } x \geq 2 \quad (3.1c)$$

The constant $b_i$ for the present time and two previous evaluations is defined in Eq. 3.2a–c:

$$b_K = \{R/(1-Q) - K_P - K_I\} \quad (3.2a)$$

where $R = (K_D T_D N)/(T_D + N h)$, $Q = T_D/(T_D + N h)$, and $K_D$ is a derivative gain constant, $T_D$ is a derivative time constant, N is a rate limiting constant and h is a measure of the amount of time required to adjust command output 58. Furthermore, $$b_{K-1} = \{-2R/(1-Q) + K_P\} \quad (3.2b)$$

$$b_{K-2} = R/(1-Q) \quad (3.2c)$$

and all $b_{K-x} = 0$, where $x \geq 3$.

Substituting Eq. 3.1a–c and Eq. 3.2a–c into general control Eq. 3 yields a three term PID control Eq 3.3, which becomes a PI equation when the third term is set to 0:

$$\Delta q_K = \Delta P_K + \Delta I_K + \Delta D_K \quad (3.3)$$

where $\Delta P_K = K_P\{E_K - E_{K-1}\}$, $\Delta I_K = K_I E_K$ and $\Delta D_K = \{R/(1-Q)\}\{y_K - 2y_{K-1} + y_{K-2}\}$ and $E_K = r_K - y_K$ is the difference between the process variable and the setpoint at time K and represents the error.

The process control application dictates appropriateness of a PI or PID control equation. When proportional gain of an control application is relatively low, varies over a wide span and the controlled variable is slow to change, as is typical in flow and liquid pressure applications, integral control action is necessary, while derivative control action is not. Such control best uses a PI control action. PID control action, on the other hand, is best suited for applications such as temperature control, where proportional gain is low, is confined to a narrow band of values and the controlled variable is slow to change.

Another type of process signal is representative of coefficients for terms of an instruction set already stored in control unit 22. For example, if modifications in pipe network 4 were required, supervisory master unit 10 sends a new value of $K_P$, in Eq. 3.1a, to control unit 22.

A final type of process signal is representative of a request for information from control unit 22. This request originates from other control units and from supervisory master unit 10, as desired. Status information such as process control statistics, current modes of operation, process variable values and unit serial numbers may be monitored.

Various types of remote device 26 can be used with control unit 22. As discussed, remote device 26 is an I/P converter receiving command output 58 applying pneumatic air 59 for positioning valve 62 as a function of command output 58. Other process control applications may control absolute pressure, temperature, conductivity, pH, oxygen concentration, chlorine concentration, density, force, turbidity, motion and others. In these applications, remote device 26 may comprise a motor, a valve for a gauge pressure application, a switch and contact as desired in a temperature controlling application, a relay in a pH or level application or other implementation device.

Figure 3:
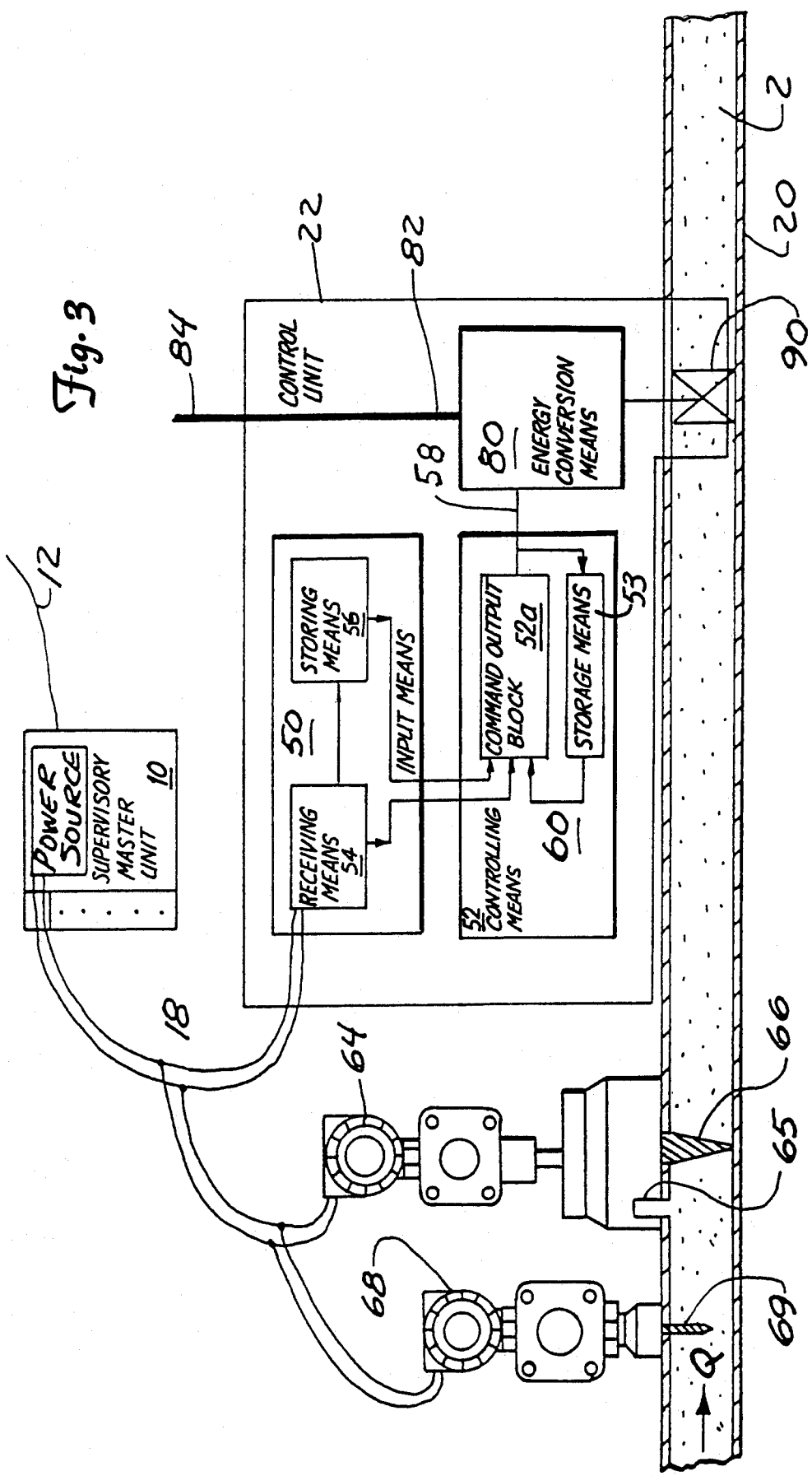
FIG. 3 shows a block diagram of a second preferred embodiment of a control unit.

A second preferred embodiment of control unit 22 is shown in FIG. 3. Control unit 22 as described in FIG. 2, further comprises energy conversion means 80, coupled to controlling means 52 by command output 58 and controlling the process. Such an embodiment of control unit 22 is also called a field actuator. Control unit 22 is connected in a two wire circuit as in the first configuration described above, but can be connected as described in other configurations. Energy conversion means 80 receives pressurized air 82, commonly available in field 34 through energy conduit 84 and applies such air 82 to position a valve 90 as a function of command output 58. Cabling 57 and remote device 26 (FIG. 2) are not included in this embodiment, and the process is controlled from control unit 22, instead of the remote device 26. Depending on the process control application, energy conversion means 80 uses other types of energy such as hydraulic or electromagnetic energy. The frequency range of electromagnetic energy may range from direct current having substantially zero frequency to light energy at varying frequencies carried on an optical fiber.

Figure 4:
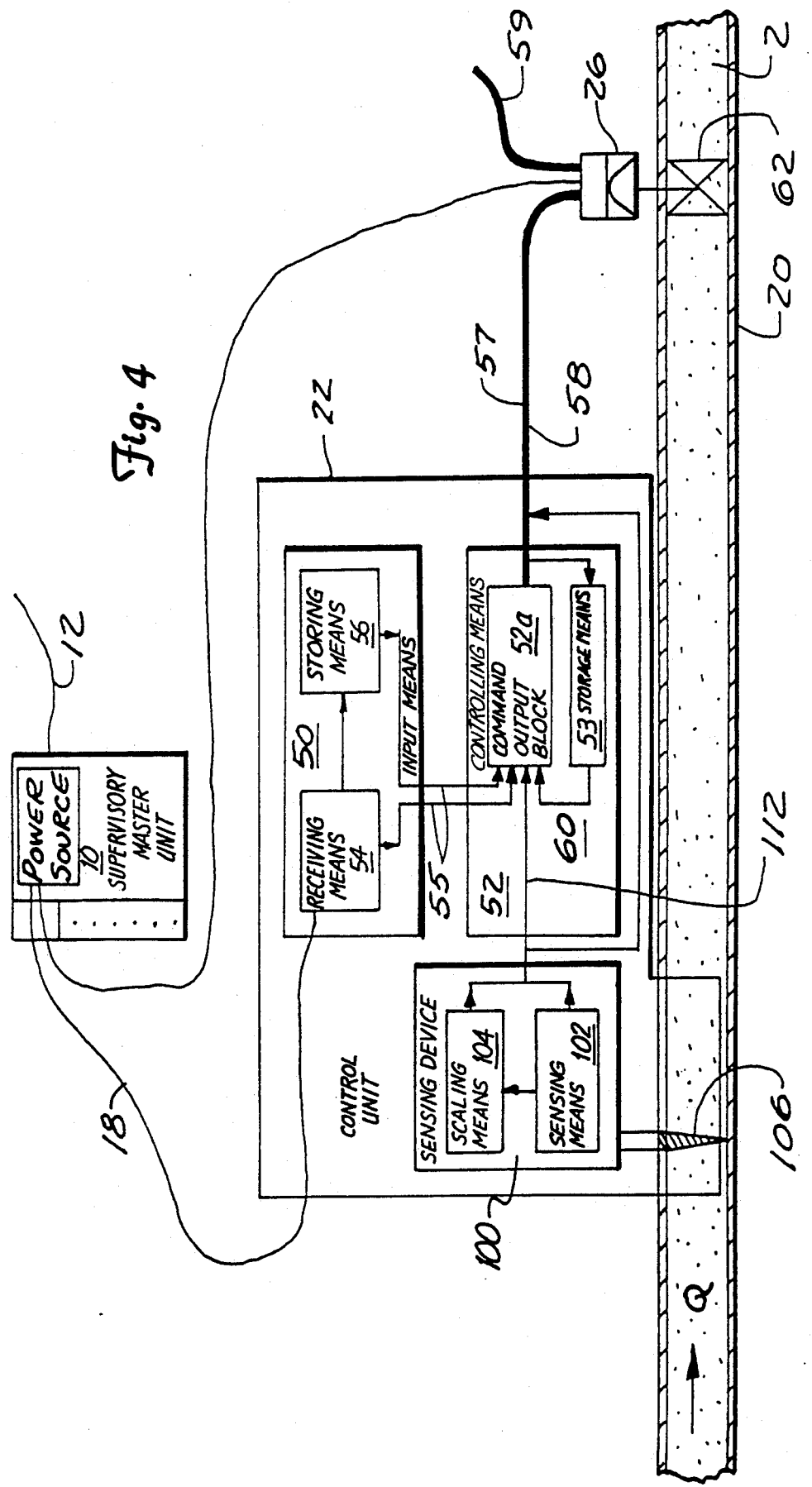
FIG. 4 shows a block diagram of a third preferred embodiment of a control unit coupled to a remote device.

A third embodiment of control unit 22 is shown in FIG. 4. The preferred first embodiment of control unit 22 further comprises a sensing device 100 having a sensed output 112 from either a sensing means 102 or a scaling means 104. In this application, flow is given by Eq. 1, requiring only a process variable representative of differential pressure. In sensing device 100, sensing means 102 senses pressure on either side of an orifice 106 protruding into fluid 2. As required, scaling means 104 scales sensed process variables according to user definable constants such as span, zero and damping. Span and zero adjustments allow known pressures to be referenced to the range extremes of sensing means 102 while damping affects the time response of the unit to a process variable input change. Scaling the process variable linearly re-ranges the process variable between two user selectable outputs typically known as "zero" and "span". A "zero" setting is an offset adjustment in that it affects all points of the process variable equally. It indicates that a selected sensor reading is the process zero and should result in a 4 mA loop current. A "span" switch sets the process maximum to 20 mA or full scale value.

The sensed output 112 of sensing means 102 and scaling means 104, as desired, is used in controlling means 52 or coupled directly to cabling 57, as desired. When sensed output 112 is coupled to cabling 57, the signal on cabling 57 is representative of the sensed process variable, as from a transmitter. Transmitters sense process variables and output a signal representative of the sensed process variable. Transmitters are known and disclosed in U.S. Pat. No. 4,833,922 by Frick et al. titled *Modular Transmitter*, owned by the same assignee and incorporated herein by reference.

Control unit 22 as shown in FIG. 4 is connected in two wire circuit 18 per the second configuration as discussed above, but may be connected in other configurations. One terminal of remote device 26 is connected via cable 57 to control unit 22 while the other is connected to master supervisor 10 by two wire circuit 18.

The ability of control unit 22 to function as a transmitter or a controller allows use of several types of process signals. Different options are available for process signals representative of process variables.

Process signals 55 representative of a process variable and those representative of a setpoint are sent over two wire circuit 18 and used by controlling means 52 for providing command output 58. Process variables sent to control unit 22 are typically representative of secondary process variables as when Eq. 2 is used to calculate flow and typically compensate the primary process variable sensed by sensing device 100. Alternatively, process signals 55 representative of a redundantly sensed primary process variable are sent via two wire circuit 18 for increased reliability in critical applications. A third command provides for simultaneous execution of the controlling mode and transmitter mode. In such dual mode operation, command output 58 is coupled to cable 57 in an analog fashion and the magnitude of cable 57 current varies as command output 58. Remote device 26 adjusts valve 62 as a function of cable 57 current magnitude. Several communication standards vary current magnitude as a function of the information sent, such as 4–20 mA and 10–50 mA current loop communications standards. Alternatively, the voltage on cable 57 is representative in a voltage magnitude communication standard such as 1–5V. Concurrently, control unit 22 digitally couples sensed process variable 112 to cable 57 in a carrier modulated fashion. For example, signals representative of a command output are encoded by the 4–20 mA standard and signals representative of a process variable are digitally encoded by a carrier modulated format. Typical carrier modulation communication standards which may be used are frequency shift key (FSK), amplitude modulation (AM), phase modulation (PM), frequency modulation (FM), Quadrature Amplitude Modulation (QAM) and Quadrature Phase Shift Key (QPSK). Alternatively, a baseband communication standard such as Manchester is used to encode process variable 112 on two wire cable 57.

Master supervisor 10 monitors process variables while control unit 22 controls the remote device 26 simultaneously, due to the series connection of master supervisor 10, control unit 22 and remote device 26 and because remote device 26 cannot change current on circuit 18 due to its passive nature. Such operation provides cost and efficiency advantages, because the number of two wire circuits needed for process control is reduced from two circuits to one circuit for each feedback loop. Absent such mode, a first two wire circuit communicates a process variable between a transmitter and master supervisor 10 and a second two wire circuit communicates a command output between master supervisor 10 and remote device 26. With such mode, a single two wire circuit connecting master supervisor 10, control unit 22 and remote device 26 in series controls the process. Wiring costs in field areas are expensive, with each feedback loop wiring representing approximately the same investment as a transmitter and a remote device. Secondly, process signals 55 representative of commands sent over two wire circuit 18 select between the two operational modes. This command directs control unit 22 to couple sensed process variable 112 or command output 58 onto cabling 57. Upon such command, the same control unit 22 functions as a transmitter or a controller, respectively. During operation as a controller, a command directing operation on exceptional basis is sent over circuit 18. Exceptional basis operation instructs control unit 22 to communicate with master supervisor 10 only when process variables received or sensed by the unit are not within specific limits. Such commands obviate master supervisory 10 monitoring or intervention in control unit 22 operation, resulting in fewer communications to maintain process control. Another advantage is increased reliability of process control, since cable 12 may be broken without compromising the process in this mode.

Thirdly, process signals 55 representative of varied instruction sets are sent to control unit 22 as appropriate for the process control application discussed above. Diverse functionality in varied applications is achieved. For example, control unit 22 senses differential pressure in a process controlling flow when a first instruction set governs controlling means 52 and senses differential pressure in a process controlling level when a second instruction set governs controlling means 52. Alternatively, control unit 22 provides command output 58 to different types of remote devices 26, changing such command output 58 as a function of process signals 55.

A fourth preferred embodiment of control unit 22 is shown in FIG. 5. Energy conversion means 80, as shown in FIG. 3, is coupled to control unit 22 as described in the third preferred embodiment of control unit 22, and functions as discussed there. Cabling 57 and remote device 26 are eliminated in this embodiment, and the process is controlled from control unit 22. Energy conversion means 80 uses other types of energy such as hydraulic or electromagnetic energy.

What is claimed is:

1. A smart field-mounted control unit for coupling to a two-wire process control loop comprising:
   a single enclosure;
   input means carried in the single enclosure coupled to the two-wire process control loop for receiving power over the two-wire process control loop, the input means comprising:
   receiving means for receiving process signals representative of more than one process variable sent by a master unit over the two-wire process control loop, and for sending information over the two-wire process control loop to the master unit;
   means for storing process signals received from the master unit which are representative of more than one process variable; and
   controlling means carried in the single enclosure coupled to the input means for providing a command output for controlling a process and for storing previous values of the command output where the command output is a function of the stored process signals and a stored previous value of the command output.

2. The apparatus as cited in claim 1 where the process signals further comprise means for determining the function for providing the command output.

3. The apparatus as recited in claim 1 where the process signals further comprise instructions for operation of the controlling means.

4. The apparatus as recited in claim 1 where the process signals further comprise commands directing operation of the controlling means.

5. The apparatus as recited in claim 1 where the process signals further comprise setpoints and where the controlling means adjust the command output as a function of the difference between the setpoint and one of the process variables.

6. The apparatus as recited in claim 1 where the process signals are digitally represented on the two-wire process control loop.

7. The apparatus as recited in claim 1 where the command output is coupled in an analog manner to a remote device over the two-wire process control loop.

8. The apparatus as recited in claim 1 further comprising:
   a sensing device coupled to the controlling means and having means for sensing and scaling a first process variable; and
   where the process signals for determining the command output further comprise the scaled first process variable.

9. A smart field-mounted control unit for controlling a process, communicating over a two-wire process control loop which powers the unit, comprising:
   a single enclosure;
   input means carried in the single enclosure coupled to the two-wire process control loop for receiving power over the two-wire process control loop, for receiving process signals over the two-wire process control loop from a master unit representative of more than one process variable, for sending information to the master unit over the two-wire process control loop, and for storing process signals;
   controlling means carried in the single enclosure coupled to the input means for providing a command output for controlling the process and for storing previous values of the command output, where the command output is a function of the stored process signals and a stored previous value of the command output;
   a source of energy capable of being regulated for controlling the process; and
   energy conversion means carried in the single enclosure coupled to the controlling means for regulating energy from the source and for applying the energy to the process as a function of the command output.

10. The apparatus as recited in claim 9 where the process signals further comprise means for determining the function for providing the command output.

11. The apparatus as recited in claim 9 where the process signals further comprise instructions for operation of the controlling means.

12. The apparatus as recited in claim 9 where the process signals further comprise commands for directing operation of the controlling means.

13. The apparatus as recited in claim 9 where the process signals further comprise setpoints and where the controlling means adjust the command output as a function of the difference between the setpoint and one of the process variables.

14. The apparatus as recited in claim 9 where the process signals are digitally represented on the two-wire process control loop.

15. The apparatus as recited in claim 9 where the command output is coupled in an analog manner to a remote device over the two-wire circuit.

16. A smart field-mounted two-wire transmitter, comprising:
   a single enclosure;
   a sensing device carried in the single enclosure having means for sensing and scaling a first process variable;

input means carried in the single enclosure coupled to a two-wire process control loop for receiving power over the two-wire process control loop, receiving process signals over the two-wire process control loop from a master unit, and for storing process signals; and controlling means carried in the single enclosure coupled to the sensing device and input means, for providing a command output to a remote device which controls a process and for storing the command output, where the command output is a function of the stored process signals, the scaled first process variable and a previously stored value of the command output.

17. The apparatus as recited in claim 16 where the process signals further comprise means for determining the function for providing the command output.

18. The apparatus as recited in claim 16 where the process signals further comprise instructions for operation of the controlling means.

19. The apparatus as recited in claim 16 where the process signals further comprise setpoints and where the controlling means adjusts the command output as a function of the difference between the setpoint and the scaled process variable.

20. The apparatus as recited in claim 16 where the controlling means adjusts the command output proportionally to a substantially linear combination of the process variable, the time integral of the process variable and the time-rate-of-change of process variable.

21. The apparatus as recited in claim 20 where the controlling means adjusts the command output, $q_k$, according to the equation, $$\Delta q_k = \Sigma \sum_{i=0}^{k} a_i r_i + \Sigma \sum_{i=0}^{k} b_i y_i$$

where $q_k$ is the command output at the kth time, $r_i$ and $y_i$ are the setpoint and process variable values at the ith time respectively, i varies from 0 to k and $a_i$ and $b_i$ are application specific constants which may be time varying.

22. The apparatus as recited in claim 16 where the process signals are digitally represented on the two-wire process control loop.

23. The apparatus as recited in claim 22 where the process signal coupling is selected from the group of communication standards comprising carrier modulation and baseband.

24. The apparatus as recited in claim 16 where the command output is coupled in a analog manner to the remote device over a pair of wires.

25. The apparatus as recited in claim 24 where the format for analogly coupling the command output to the pair of wires is selected from the group of formats comprising 4-20 mA, 10-50 mA and 1-5V.

26. The apparatus as recited in claim 16 where the sensing device further comprise sensors selected from the group of sensors sensing pressure, temperature, flow, mass, conductivity, moisture, pH, oxygen concentration, chlorine concentration, density, force and turbidity.

27. An apparatus for improving a smart transmitter which is powered by a two-wire process control loop and which is coupled to and communicates with a remote device which controls a process, the transmitter having sensing means for sensing a first process variable, scaling means coupled to the sensing means for scaling the sensed process variable, communications means coupled to the scaling means for coupling the sensed process variable to the two-wire process control loop, characterized in that the apparatus comprises:

a single enclosure;

input means carried in the single enclosure for input and storage coupled to the two-wire process control loop for receiving process signals from a master unit over the two-wire process control loop, and for receiving power over the two-wire process control loop; and controlling means carried in the single enclosure coupled to the input means for providing a command output to the remote device and storing the command output, where the command output is a function of the process signals, the scaled process variable and a previously stored value of the command output.

28. The apparatus as recited in claim 27 where the process signals further comprise means for determining the function for providing the command output.

29. The apparatus as recited in claim 27 where the process signals further comprise instructions for operation of the controlling means.

30. The apparatus as recited in claim 27 where the process signals further comprise setpoints and where the controlling means adjust the command output as a function of the difference between a setpoint and the scaled process variable.

31. The apparatus as recited in claim 27 where the controlling means adjusts the command output proportionally to a substantially linear combination of the process variable, the time integral of the process variable and the time-rate-of-change of process variable.

32. The apparatus as recited in claim 31 where the controlling means adjusts the command output, $q_k$, according to the equation, $$\Delta q_k = \Sigma \sum_{i=0}^{k} a_i r_i + \Sigma \sum_{i=0}^{k} b_i y_i$$

where $q_k$ is the command output at the kth time, $r_i$ and $y_i$ are the setpoint and process variable values at the ith time respectively, i varies from 0 to k and $a_i$ and $b_i$ are application specific constants which may be time varying.

33. The apparatus as recited in claim 27 where the process signals are digitally represented on the two-wire process control loop.

34. The apparatus as recited in claim 27 where the command output is analogly coupled to the remote device over a pair of wires.

35. The apparatus as recited in claim 27 where the sensing means further comprise sensors selected from the group of sensors sensing pressure, temperature, flow, mass, conductivity, moisture, pH, oxygen concentration, chlorine concentration, density, force and turbidity.

36. The apparatus as recited in claim 27 where the process signals are representative of redundant process variables.

37. A smart field-mounted transmitter powered by a first two-wire circuit and sending an output onto a second two-wire circuit, comprising:

a single enclosure;

a sensing device carried in the single enclosure having means for sensing and scaling a first process variable;

input means carried in the single enclosure coupled to the first two-wire circuit for receiving other process variables from a master unit over the first two-wire circuit, for transmitting information to the master unit over the two-wire circuit, and storing the other process variables;

compensation means carried in the single enclosure coupled to the input means for compensating one of the process variables as a function of the other process variables; and output means carried in the single enclosure coupled to the compensation means for coupling the compensated process variable to the second two-wire circuit.

* * * * *